(12) United States Patent
Ma et al.

(10) Patent No.: US 8,467,570 B2
(45) Date of Patent: Jun. 18, 2013

(54) TRACKING SYSTEM WITH FUSED MOTION AND OBJECT DETECTION (75) Inventors: Yunqian Ma, Roseville, MN (US); Qian Yu, Los Angeles, CA (US); Isaac Cohen, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 1149 days.

(21) Appl. No.: 11/562,266

(22) Filed: Nov. 21, 2006

(65) Prior Publication Data

US 2008/0002856 A1 Jan. 3, 2008

Related U.S. Application Data (63) Continuation-in-part of application No. 11/548,185, filed on Oct. 10, 2006.

(60) Provisional application No. 60/804,761, filed on Jun. 14, 2006.

(51) Int. Cl.
*G06K 9/00* (2006.01)

(52) U.S. Cl.
USPC .......................................... 382/103; 382/100

(58) Field of Classification Search
USPC .. 382/103, 291, 100, 190, 203, 224; 348/154, 348/155, 699
See application file for complete search history.

(56) References Cited

U.S. PATENT DOCUMENTS

| | | | | |
|---|---|---|---|---|
| 5,787,194 A * | 7/1998 | Yair | | 382/173 |
| 5,802,208 A * | 9/1998 | Podilchuk et al. | | 382/224 |
| 5,864,630 A * | 1/1999 | Cosatto et al. | | 382/103 |
| 6,173,066 B1 * | 1/2001 | Peurach et al. | | 382/103 |
| 6,320,976 B1 * | 11/2001 | Murthy et al. | | 382/128 |
| 6,728,404 B1 * | 4/2004 | Ono et al. | | 382/190 |
| 6,801,662 B1 * | 10/2004 | Owechko et al. | | 382/224 |
| 6,826,292 B1 * | 11/2004 | Tao et al. | | 382/103 |
| 7,092,924 B1 * | 8/2006 | Levedahl | | 706/45 |
| 7,359,526 B2 * | 4/2008 | Nister | | 382/100 |
| 7,426,301 B2 * | 9/2008 | Porikli | | 382/181 |
| 7,620,216 B2 * | 11/2009 | Hammoud | | 382/117 |
| 7,756,341 B2 * | 7/2010 | Perronnin | | 382/224 |
| 7,929,771 B2 * | 4/2011 | Ko et al. | | 382/190 |

(Continued)

FOREIGN PATENT DOCUMENTS

JP 2002032742 A * 1/2002

OTHER PUBLICATIONS

Siebel et al, "Fusion of Multiple Tracking Algorithms for Robust People Tracking", LNCS 2353, pp. 373-387 2002 Springer.*

(Continued)

*Primary Examiner* — Jason M Repko
*Assistant Examiner* — Avinash J Yentrapati
(74) *Attorney, Agent, or Firm* — Seager Tufte & Wickhem LLC (57) ABSTRACT A detection system fusing motion detection and object detection for various applications such as tracking, identification, and so forth. In an application framework, model information may be developed and used to reduce the false alarm rate. With a background model, motion likelihood for each pixel, for instance, of a surveillance image, may be acquired. With a target model, object likelihood for each pixel of the image may also be acquired. By joining these two likelihood distributions, detection accuracy may be significantly improved over the use of just one likelihood distribution for detection in applications such as tracking.

6 Claims, 5 Drawing Sheets

U.S. PATENT DOCUMENTS

| | | | | |
|---|---|---|---|---|
| 8,031,906 B2* | 10/2011 | Fujimura et al. | | 382/103 |
| 2002/0122596 A1* | 9/2002 | Bradshaw | | 382/226 |
| 2003/0169945 A1* | 9/2003 | Stanek | | 382/293 |
| 2004/0120581 A1* | 6/2004 | Ozer et al. | | 382/224 |
| 2005/0058337 A1* | 3/2005 | Fujimura et al. | | 382/159 |
| 2005/0104962 A1* | 5/2005 | Han et al. | | 348/143 |
| 2005/0105780 A1* | 5/2005 | Ioffe | | 382/118 |
| 2005/0238198 A1* | 10/2005 | Brown et al. | | 382/103 |
| 2005/0285937 A1* | 12/2005 | Porikli | | 348/143 |
| 2005/0286774 A1* | 12/2005 | Porikli | | 382/225 |
| 2006/0053342 A1* | 3/2006 | Bazakos et al. | | 714/37 |
| 2006/0093188 A1* | 5/2006 | Blake et al. | | 382/103 |
| 2006/0177099 A1* | 8/2006 | Zhu et al. | | 382/104 |
| 2006/0182339 A1* | 8/2006 | Connell | | 382/170 |
| 2006/0285755 A1* | 12/2006 | Hager et al. | | 382/224 |
| 2007/0005356 A1* | 1/2007 | Perronnin | | 704/245 |
| 2007/0133840 A1* | 6/2007 | Cilia | | 382/103 |
| 2007/0217676 A1* | 9/2007 | Grauman et al. | | 382/170 |
| 2007/0237355 A1* | 10/2007 | Song et al. | | 382/100 |
| 2008/0089561 A1* | 4/2008 | Zhang | | 382/118 |
| 2009/0041297 A1* | 2/2009 | Zhang et al. | | 382/103 |
| 2012/0058775 A1* | 3/2012 | Dupray et al. | | 455/456.1 |

OTHER PUBLICATIONS

Perez et al, "Data Fusion for Visual Tracking with Particls", IEEE vol. 92 No. 3 Mar. 2004.*

Krystian et al, "Scale and Affine Invariant Interest Point Detectors", International Journal of Computer Vision, 60(1), 63-68, 2004.*

Shan et al., "Measuring the Similarity of Two Image Sequences," Asia Conference on Computer Vision, 6 pages, 2004.

Zhou et al., "From sample similarity to ensemble similarity: Probabilistic distance measures in reproducing kernel Hilbert space," IEEE Transactions on Pattern Analysis and Machine Intelligence, vol. 28, Issue 6, pp. 1-34, Jun. 2006.

Zwald et al., "Statistical Properties of Kernel Principal Component Analysis," The 8th Kernel Workshop, pp. 1-15, Jul. 4, 2004.

* cited by examiner

TRACKING SYSTEM WITH FUSED MOTION AND OBJECT DETECTION

This application claims the benefit of U.S. Provisional Application No. 60/804,761, filed Jun. 14, 2006. This application is a continuation-in-part of U.S. patent application Ser. No. 11/548,185, filed Oct. 10, 2006. U.S. Provisional Application No. 60/804,761, filed Jun. 14, 2006, is hereby incorporated by reference. U.S. patent application Ser. No. 11/548,185, filed Oct. 10, 2006, is hereby incorporated by reference.

BACKGROUND

The present invention pertains to surveillance systems and particularly to tracking. More particularly, the invention pertains to object tracking.

SUMMARY

The invention is a system fusing motion and object detection for various applications such as tracking.

DESCRIPTION

The present invention is a detection system, for various applications such as tracking, identification, and so forth, which is enhanced with a fusion of motion detection and object detection of targets. For an illustrative example, tracking of pedestrians or vehicles is a foundation of video surveillance. Algorithms for such tracking may incorporate just object detection or just motion detection. In some instances, motion detection may produce poor results for pedestrian or vehicle tracking. Also, in some instances, object detection may produce insufficient results for tracking. A solution for improved tracking may involve building an object detection probability map. Instead of separating the detection and tracking into two separate procedures, a probabilistic framework may be used for automatic detection and tracking of objects, which combines the detection and tracking together. It may involve finding how likely an image blob is a target (i.e., human or car) and how likely a pixel belongs to the moving foreground. With a target probability map, motion detection may be improved and better overall tracking of targets may be provided.

Figure 2:
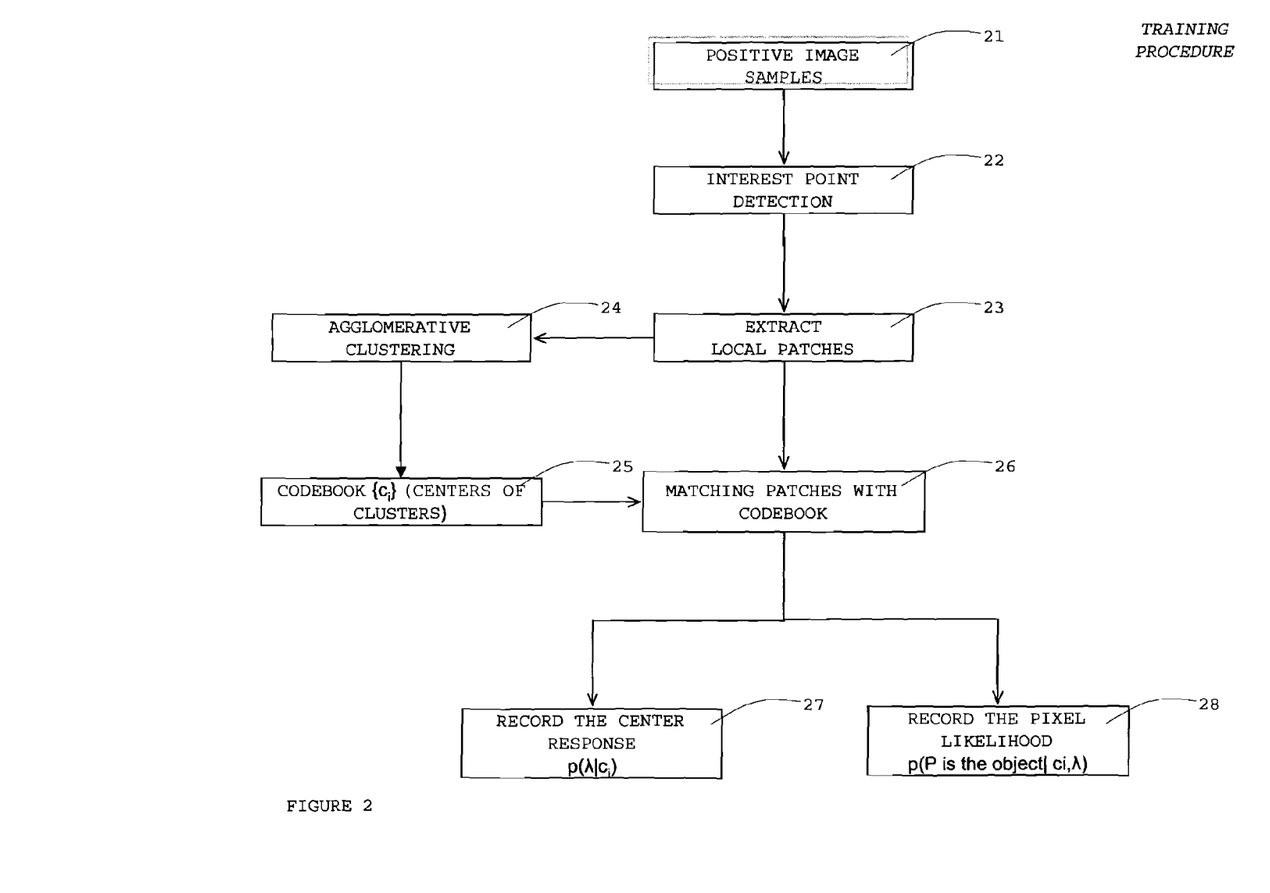
FIG. 2 is a diagram showing the training phase of the system.

To improve the tracking situation, a local scale-invariant feature may be applied to build an implicit shape model (ISM), which may be demonstrated to yield good recognition results with a tolerance of shape variance. A training phase may proceed in several steps, as shown in FIG. 2. The training phase is applied on positive image samples 21. A positive sample contains two parts, the image covered by a minimum bounding box of a target (human) and the segmentation (mask) of the target against background. First, the interest point detector 22 is applied on each positive sample image (i.e., the maxima of a difference of Gaussian (DoG) operator). And then the local patch (say 25×25 pixels) around each interest point may be collected 23. Agglomerative clustering 24 is applied on the extracted local patches. Now, a codebook of a local appearance which is characteristic for the object category may be built by collecting the center of each cluster, which encodes the appearance of common features on positive image samples. Resulting clusters may form a compact representation of a local object model, referred to as a codebook $\{c_i\}$ 25. Each cluster center may be regarded as a codeword and stored as a codebook entry. Procedures 21, 22, 23, 24 and 25 form a flow of generating codebook $\{c_i\}$. This codebook will be used the next two training flows. One flow (23, 26, 27), is to determine each code entry's contribution to the center of the target, and the other flow (23, 26, 28) is to determine the likelihood of that each pixel in a code entry belongs to foreground (target). Such information may encode the shape information relative to some scale invariant feature (this approach is not an affine invariant). And this information may be used to perform a general Hough voting procedure.

Given a test image, image patches may be extracted using the sample procedure 21, 22, 23 as in training and matched to the codebook. Each of the image patches could be matched with a multiple codeword. Each matched codeword may vote to all corresponding target centers. The voting space may be defined in $\lambda=(x, y, s)$, where x, y is a 2-D vector relative to the center of the codeword and s is the scale of the extracted image patches. One may search for hypotheses as maxima in the voting space, which indicates there is a target at $\lambda=(x,y,s)$, i.e., the target center is located at x,y and the scale of target is s. One may note that the scale s is not the size (w,h) of a target. The size of a target may be recovered after one segments the target in detection parts.

Given one hypothesis, one may hope to acquire how likely a pixel belongs to the present target. By answering this question, one may acquire a segment of a hypothesis target. One can obtain this information by marginalizing over all of the patches that contain this pixel. This means that for every pixel, one may build a weighted average over all patches containing that pixel. The weight may be proportional to the contributions to the hypothesis of each patch.

In the present tracking framework, model information may be used to reduce the false alarm rate. By establishing a background model, one may compute the motion likelihood for each pixel. By using the target model, one may acquire the model likelihood for each pixel as well. By joining these two likelihood distributions, one may significantly improve the detection accuracy and thus tracking performance.

Figure 1:
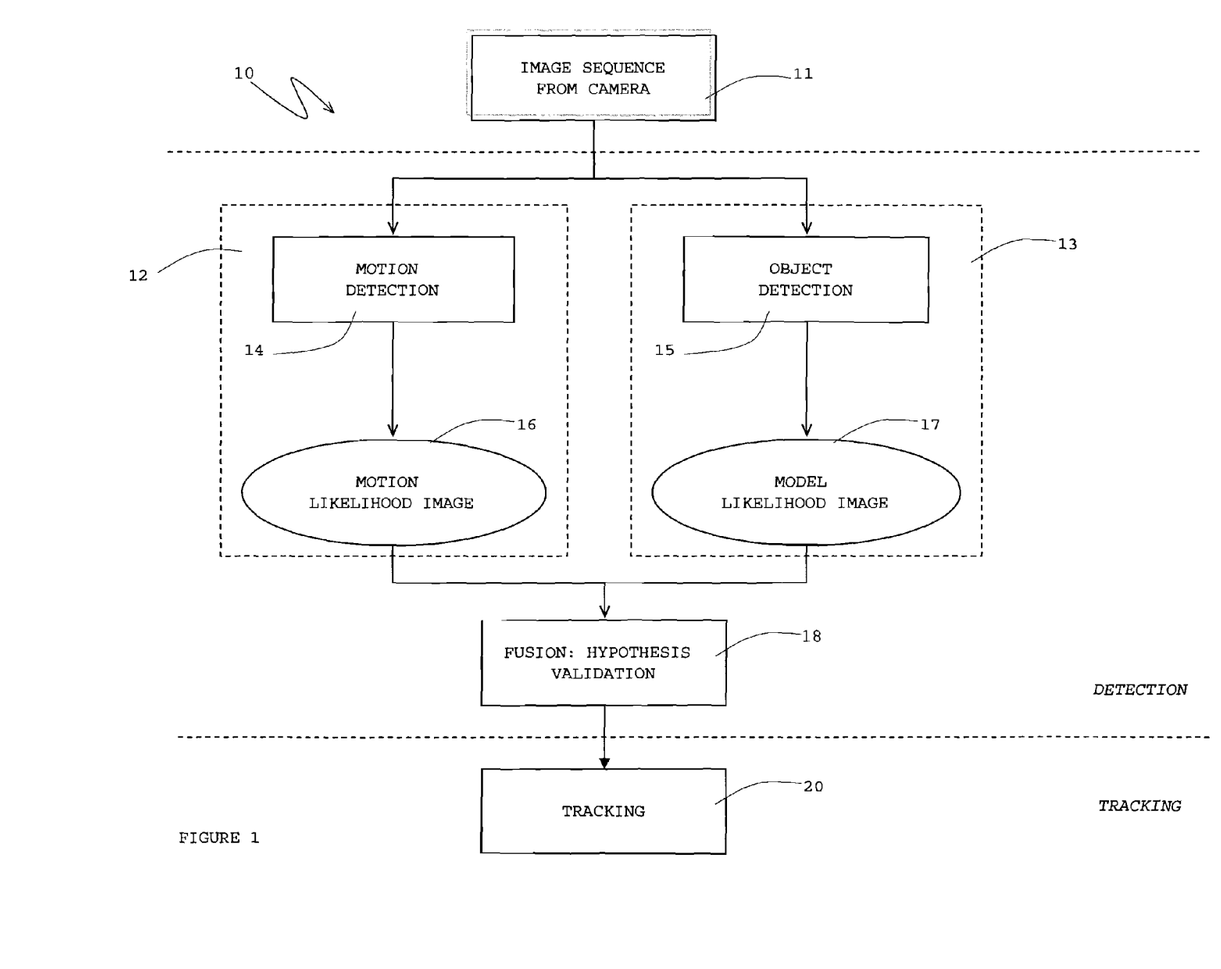
FIG. 1 is a diagram showing overall motion and object detection system.

For further description, the present system 10 may be looked at in the context of FIGS. 1-4. Images or an image sequence 11 may be acquired by and/or obtained from a camera or video streamer. It may be said that there is an input video stream or a streamer channeling video data from various cameras. The sequence 11 may be fed in a parallel fashion to a motion detection channel 12 and an object detection channel 13 in the detection module of the present system 10, as shown in FIG. 1.

The motion detection channel 12 may have a motion detection module 14 with the image sequence 11 input. The motion detection module 14 may use background subtraction to get just foreground. The camera may provide a sequence of images or frames of its respective field of view. The selected regions could be motion blobs separated from the background according to motion of the foreground relative to the background, or be selected regions of interest provided by an operator or computed in some way. These regions may be observations. Numerous blobs may be present in these regions. Some may be targets and others false alarms (e.g., trees waving in the wind).

The output of motion detection module 14 may go to a motion likelihood image module 16. For a motion likelihood image module 16, in the case of a stationary camera, a Gaussian background model may be established for each pixel. Thus, given the intensity of a pixel, the likelihood of whether this pixel belongs to the foreground may be computed. This information may be used in a hypothesis validation 18 procedure shown in FIG. 4.

Figure 3:
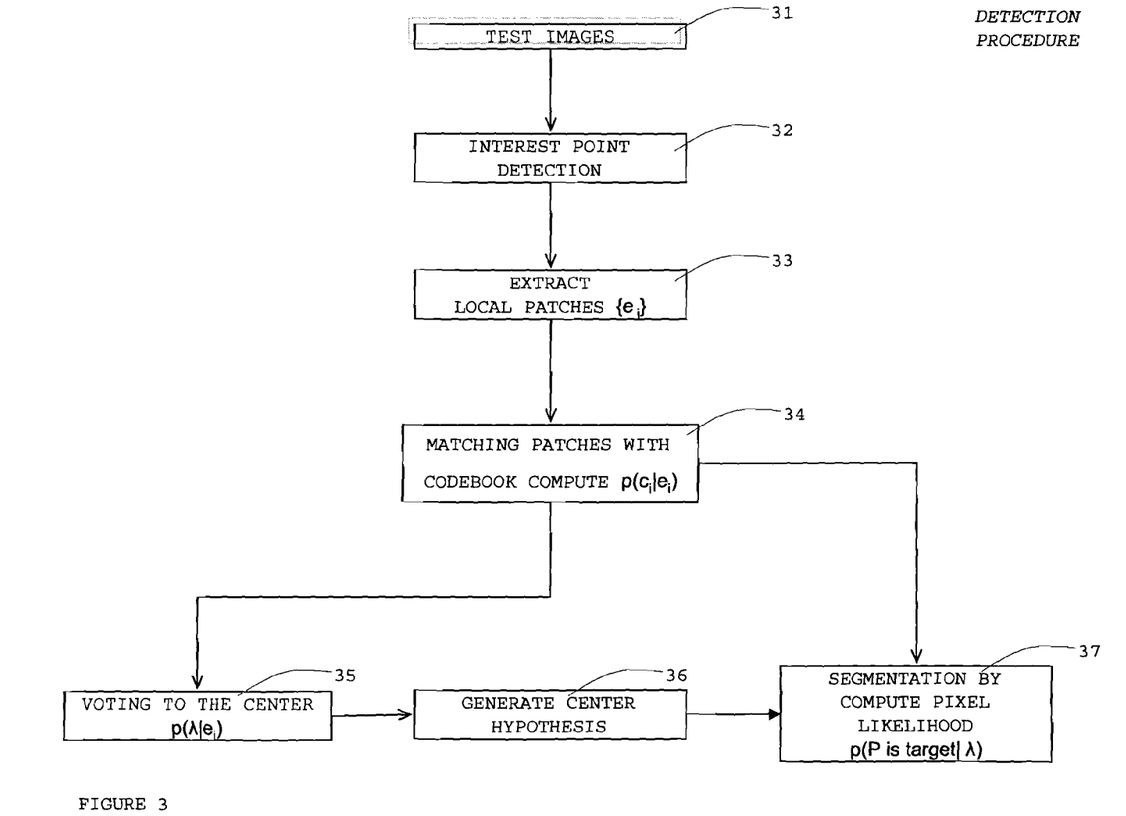
FIG. 3 is a diagram showing the detection phase of the system.

The image sequence 11 may be an input to an object detection module 15 of object detection channel. In object detection, an implicit shape model (ISM) may be used for pedestrian or car detection. Aspects of this "object detection" are shown in FIGS. 2 and 3; FIG. 2 is for training and FIG. 3 is for testing. The output of the object detection module 15 may go to a model likelihood image module 17. For a model likelihood image module 17, the likelihood may be of whether each pixel belongs to the target.

The outputs of the motion likelihood image module 16 and the model likelihood image module 17 may go to the fusion module 18 (i.e., combiner, merger, joiner, consolidator, and the like). From the results of the motion detection channel 14 and the object detection channel 15, one may acquire a motion and model likelihood. The cues from the motion and the model may be merged at module 18 to generate a possible hypothesis to be fed into the tracking system 20 (prior application and non-provisional).

FIGS. 2 and 3 pertain to the training and detection (testing) phases, respectively, for the object detection channel 13 of FIG. 11. A "positive image sample" may mean that the image has the interested object or target, e.g., a person such as a pedestrian. The positive images here, as noted in module 21, may be patches cut from images within the minimum bounding rectangle for one target. For each positive image sample, a mask of the target is required. For example, in pedestrian detection, it means the smallest patch which contains a pedestrian in it. To acquire such an accurate mask, one may use the motion segmentation of a sequence and select the good segmentation from the results as the masks in positive samples.

For the training phase of FIG. 2, only the positive image samples are considered. After the positive image samples module 21, an interest point detection module 22 follows. At the module 22, a scale-invariant DoG operator may be applied on the positive image samples. The local maximums on the DoG images may be regarded as interest points. A module 23, which follows module 22, is where local patches proportionally to the detected scale on the DoG operator may be extracted. Then the image patches may be re-scaled to a fixed size such as 25×25 pixels.

Subsequent to module 23, may be an agglomerative clustering module 24. The clustering of this may involve an unsupervised learning method. Note that, the agglomerative cluster is different with K-Mean clustering. The latter one requires the number of clusters K before clustering. The agglomerative clustering only requires the distance of samples within one cluster should be small enough. A result of agglomerative clustering is a center of clusters. If a result of the similarity calculation is greater than a predetermined threshold set for similarity purposes, then these two clusters may be merged into one cluster.

Following the agglomerative clustering module 24 may be a codebook ($c_i$) module 25 having the result of agglomerative clustering which includes the centers of clusters, $c_1, \ldots c_n$. These centers of clusters may be regarded as code entries. A set of code entries may be regarded as a codebook. In module 26, there may be matching patches from module 23 with the codebook of module 25. Having the code entries, for each patch (e), the distance to each code entry may be computed. A normalized inverse distance may be used as a conditional probability of $c_i$, given a patch e which is stated as "$p(c_i|e)$". The normalized inverse distance may be computed as $$d^{-1}(c_i,e)/(\Sigma_i d^{-1}(c_i,e)).$$

Beyond module 26 is a module 27 "record the center response $p(\lambda|c_i)$". $\lambda=(\lambda_x, \lambda_y, \lambda_s)$ represents the center of a target which may be used in the testing phase of FIG. 3. In the procedure here, the probability of $p(\lambda|c_i)$ may be trained. The $p(\lambda|c_i)$ may indicate the contribution of a code entry to the one possible center $\lambda$. To compute $p(\lambda,c_i)$, the equation, $$p(\lambda|c_i)=p(\lambda,c_i)/(\Sigma_\lambda p(\lambda,c_i)),$$

may be used. This equation may indicate the number of instances that $c_i$ contributes to $\lambda$ over the number of instances that $c_i$ contributes to all $\lambda$'s. The probability of $p(\lambda|c_i)$ may be used in the detection procedure in FIG. 3, particularly the "voting to the center" module 35.

Also following module 26 is a module 28 "record the pixel likelihood, $p(P$ is the object$|c_i,\lambda)$". This is the other probability to be computed in the training procedure which may be used to segment targets from the background. The meaning of this conditional probability may be the probability of a pixel P of $c_i$ is on target given the center of the target. To compute $p(P$ is target$|c_i,\lambda)$, the equation that may be used is the following, $$p(P \text{ is target}|c_i,\lambda)=\Sigma_e p(P \text{ is target},e|c_i,\lambda)=\Sigma_e p(P \text{ is target}|e,c_i,\lambda)p(e|c_i,\lambda),$$

which may be computed for all patches e which correspond to $c_i$, the number of patches e, which P is on a target over the number of e. The probability $p(P$ is target$|c_i,\lambda)$ may be used in the detection procedure, particularly the segmentation module 37 of FIG. 3.

The detection procedure is shown in FIG. 3. A "test images" module 31 may include interested objects, for example, for a pedestrian detection application. The test images may include one or more pedestrians. Following module 31 may be an "interest point detection" module 32. The procedure of this module is similar to the interest point detection of module 22 in FIG. 2. The next module 33 which is "extract local patches ($e_i$)" is similar to the extract local patches module 23 of FIG. 2. A module 34, "matching patches with codebook compute $p(c_i|e_i)$", which follows module 33, is similar to the "matching patches with codebook" module 26 in FIG. 2.

The "voting to the center $p(\lambda|e_i)$" module 35 may follow module 34. Voting to the center may involve $p(\lambda)=\Sigma_e p(\lambda|e)p(e)$. Each patch may be assumed to have equal voting weight, namely, $p(e)$ is of uniform distribution. Thus, $p(\lambda)$ is proportional to $\Sigma_e p(\lambda|e)$. To compute $p(\lambda|e)$, the following equation, $$p(\lambda|e)=\Sigma_{ci}p(\lambda,ci|e)=\Sigma_{ci}p(\lambda|c_i,e)p(c_i|e)=\Sigma_{ci}p(\lambda|c_i)p(c_i|e),$$

may be used, where $p(\lambda|c_i)$ is computed in a training procedure of module 27, "record the center response $p(\lambda|c_i)$" in FIG. 2; and where $p(c_i|e)$ is computed as the normalized distance between $c_i$ and e. The second equality holds because given the patch's corresponding code entry the center of the targets is independent of each patch.

Following module 35 may be a module 36, "generate center hypothesis". The result is a location of the object detected. A hypothesis of targets' centers may be selected by thresholding the $p(\lambda)$. Module 37, which may have inputs from modules 34 and 36, is segmentation by computing the pixel likelihood p(P is target|λ), which is the probability of P being on a target given the center of the target. It may be noted that the center of the target is the hypothesis obtained from module 36 "generate center hypothesis".

After the location of the detected object is known, the size and shape of the object can be sought by segmenting the target against the background. Given a location hypothesis, one can segment the target by computing the probability p(P is target|λ) for each pixel P. To compute the probability p(P is target|λ), the following equation may be used.

ti $p(P \text{ is target}|\lambda) = \Sigma_{c_i} p(P \text{ is target}, c_i|\lambda) = \Sigma_{c_i} p(P \text{ is target}|c_i, \lambda) p(c_i|\lambda) = \Sigma_{c_i} p(P \text{ is target}, |c_i, \lambda) \Sigma_e p(c_i, e|\lambda) = \Sigma_{c_i} p(P \text{ is target}, |c_i, \lambda) \Sigma_e p(\lambda|c_i, e) p(c_i|e) p(e)/p(\lambda) \Sigma_{c_i} p(P \text{ is target}, |c_i, \lambda) \Sigma_e p(\lambda|c_i) p(c_i|e) p(e)/p(\lambda)$ where p(P is target,$c_i$,λ) may be computed in the training procedure module 28 "record the pixel likelihood" of FIG. 2, p(λ|$c_i$) may be computed in the training procedure module 27 "record the center response", p($c_i$|e) is the normalized inverse distance between e and $c_i$, p(e) is equal to one over the number of patches, and p(λ) is equal to one over the number of hypotheses. The last equality holds because given the patch's corresponding code entry the center of the targets is independent of each patch.

After the above detection procedure, one has multiple hypotheses of the targets' location and for each hypothesis one can segment the target against background. Then one can compute p(P is target)=p(P is target|λ)p(λ), where p(λ) is equal to one over the number of hypotheses. Now, segmentation may be performed according to p(P is target). The probability indicates whether the pixel is an object or not. A way to segment targets according the model likelihood map is to threshold the map. However, direct thresholding may not be robust due to the difficulty in determining the parameter. Here, one may use a minimal description length (MDL) based verification stage to validate the hypotheses obtained in the detection procedure. More important, in the verification stage, one may combine the model likelihood map and motion likelihood map together. A key of this step is to integrate model and motion information about the target itself and discard misleading influences from the background. At the same time, the segmentation may reveal from where in the image a hypothesis draws its support.

Figure 4:
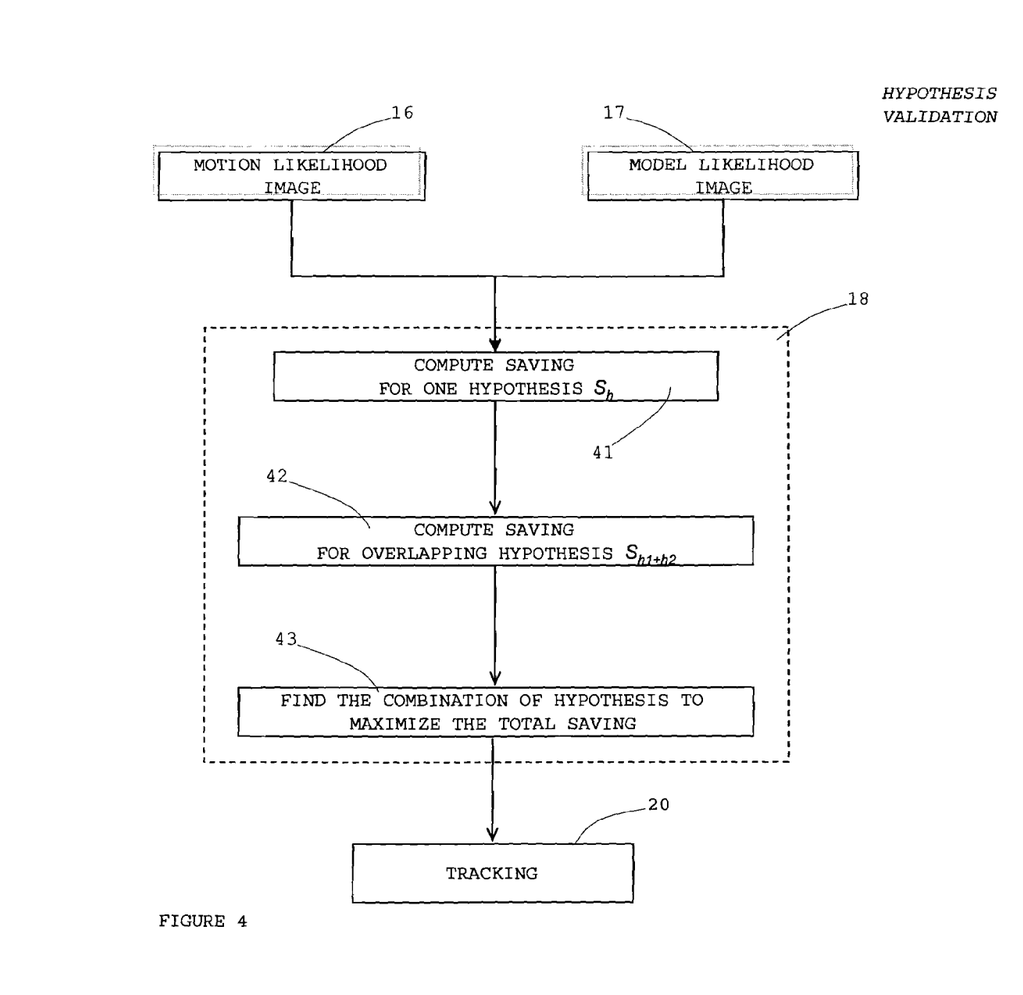
FIG. 4 is a diagram showing the hypothesis validation of the fusion phase.

Hypotheses may be evaluated in terms of the savings (S) that can be obtained by explaining part of an image by the hypothesis h. FIG. 4 shows details of the fusion hypothesis validation module 18 in FIG. 1. Inputs to detailed module 18 of FIG. 4 are the motion likelihood image of module 16 and the model likelihood image of module 17, also shown in FIG. 1. The inputs from modules 16 and 17 are to a "compute saving for one hypothesis Sh" module 41. Having the likelihood of that each pixel belongs to an object or not, an attempt may be made to search for a hypothesis according to the following criteria. First, the rectangle of a hypothesis should cover as much as possible area of the image ($S_{area}$). Second, the rectangle of a hypothesis should cover as little as possible area of non-motion pixels ($\alpha S_{non-motion}$). And third, the rectangle of the hypothesis should cover as little as possible area of the non-object pixels ($\beta S_{non-object}$). Thus, the saving of the one single hypothesis may be defined as $$S_h = S_{area} - \alpha S_{non-motion} - \beta S_{non-object},$$

where α and β are weight parameters. $S_{area}$ may correspond to the number N of pixels that can be explained by h; $S_{non-motion}$ may denote the cost for describing the motion error made by this explanation; $S_{non-object}$ may denote the cost for describing the model error made by this explanation; $S_{non-motion} = \Sigma p \, 1-(\text{p is motion}|h)$ and $S_{non-object} = \Sigma p \, 1-(\text{p is object}|h)$.

Module 41 is only for computing the saving for one single hypothesis without considering the overlapping between hypotheses. For overlapping hypotheses, Module 42 is applied (following module 41) as "compute the saving for multiple overlapping hypothesis, $S_{h_1+h_2}$". One may use two hypotheses for an example; for more than two hypotheses similar saving can be defined by De Morgan's laws. Since each single pixel can only be assigned to a single object, this step makes it possible to resolve ambiguities between overlapping hypotheses and search for the subset that best explains the image. The equation for such computation may be, $$S_{h_1+h_2} = S_{h_1} + S_{h_2} - S_{area}(h_1 \cap h_2) + S_{non-motion}(h_1 \cap h_2) + S_{non-object}(h_1 \cap h_2).$$

If the hypotheses have no overlapping in that $h_1 \cap h_2 = 0$, then clearly $S_{h_1+h_2} = S_{h_1} + S_{h_2}$.

With input from module 42, module 43 in FIG. 4 is "find the combination of hypotheses to maximize the total saving". The width and height for each hypothesis may be changed for each hypothesis to search for the best combination of hypotheses. The combination of the hypotheses amounts to the fusion of object detection and motion detection for going on to tracking 20.

Figure 5:
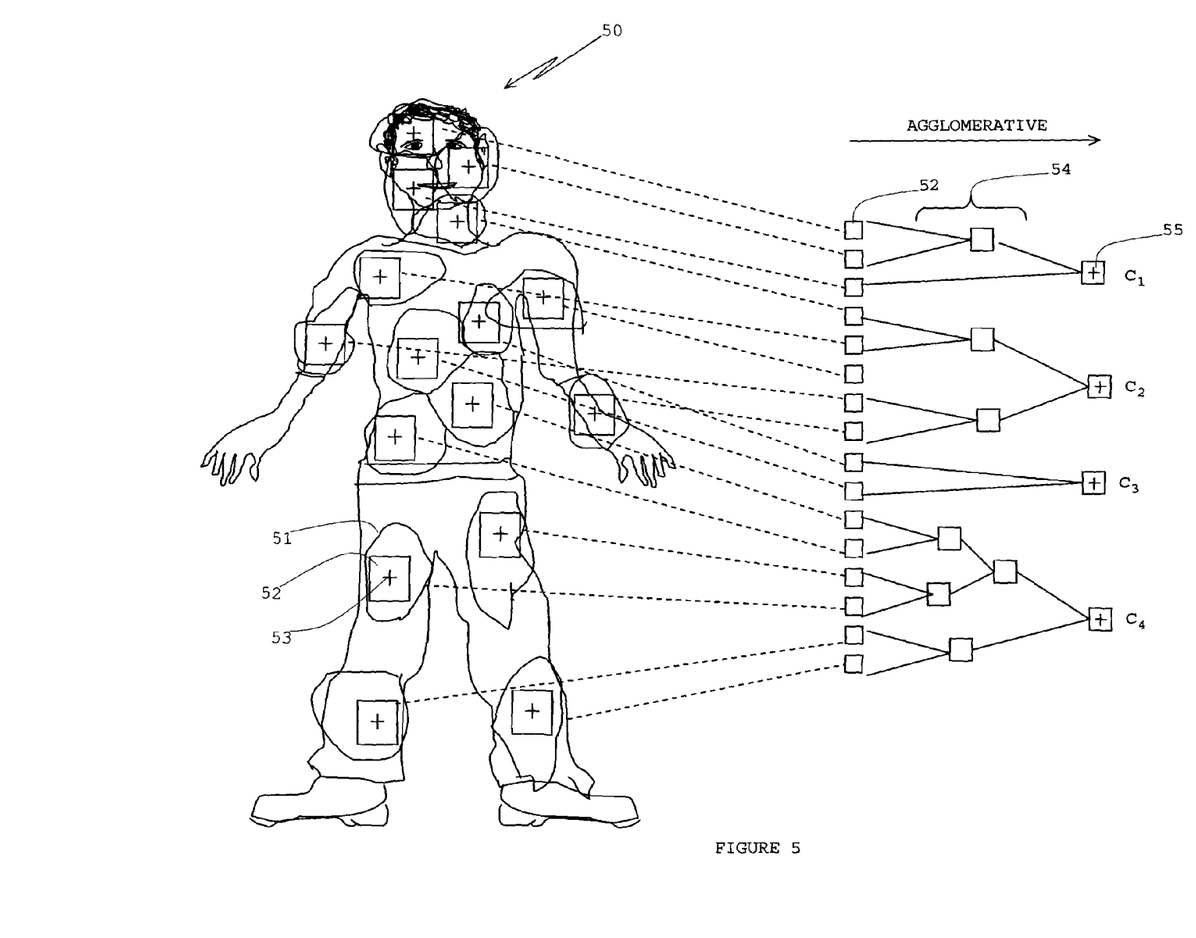
FIG. 5 is a diagram showing patch extraction of an object image, clustering of patches, and a basis for a codebook.

To elaborate on the clustering and codebook entries, FIG. 5 illustrates an approach for learning a codebook of local appearances that are characteristic of the object category. This may be done by applying a scale-invariant DoG interest point operator to training images and extracting image patches. The extracted images may be rescaled to a fixed size of, for example, 25×25 pixels, and then grouped using agglomerative clustering. The resulting clusters may form a compact representation of the local object 50 structure. The cluster centers may be stored as codebook entries.

The object 50 may be a person and image patches 51 may extracted of the image of object 50. Each of the image patches may have centers (+) 53. Each of the patches 51 may be re-scaled to a standard size of 25×25 pixels as a normalized patch 52. Agglomerate clustering of patches 52 may involve computing the similarity of a pair of patches, or a patch with a cluster. If the similarity of the compared patches 52 and/or clusters 54 is greater than a predetermined threshold, then the patches 52 may be clustered or combined into another patch or cluster 54, or a cluster or patch 55. In a hierarchical fashion, pairs of resultant patches 54 may have their similarities computed, and if a similarity is greater than a set threshold, then the respective pair of patches 54 may be clustered or combined into another patch 55. However, the various pairings of patches or clusters might not be of the same level in the hierarchical fashion. FIG. 5 shows an example of combining of patches and clusters of different levels.

FIG. 5 shows that further clustering might not be possible beyond clusters 55 in that different portions of object 50 resulting in clusters 55 are not similar enough to exceed a set threshold for similarity. The four resulting clusters 55 may be regarded as having cluster centers and become code entries for a codebook. The codebook for the object 50 would be noted to have four pages (i.e., four cluster centers $c_1$, $c_2$, $c_3$, and $c_4$)

This clustering should guarantee that only those patches and/or clusters are grouped which are visually similar. From the resulting clusters the cluster centers may be computed and stored in the codebook. The codebook may be used to train a classifier and used to generate top-down segmentation for each recognition hypothesis. For the respective hypothesis, one may go back to the image to determine on a per-pixel level where its support came from, thus effectively segmenting the object from the background.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A detection method comprising:
   streaming video with a camera;
   detecting motion in the video step for providing a motion likelihood image;
   detecting an object in the video step for providing a model likelihood image;
   fusion of the motion likelihood image and the model likelihood image;
   wherein detecting object in a training phase comprises:
      providing positive image samples of an object;
      an extraction step for detecting a plurality of interest points on an object and extracting local image patches around the interest points;
      agglomerative clustering step for generating a codebook;
   wherein detecting an object in the video comprises:
      extracting a plurality of image patches around each of the plurality of interest points on the object;
      clustering the plurality of image patches by similarity by agglomerative clustering;
      the plurality of image patches is matched with a codeword in a codebook;
   wherein the fusion comprises:
      computing savings for a hypothesis of the motion likelihood image and the model likelihood image;
      computing savings for overlapping hypotheses of the motion likelihood image and the model likelihood image;
      fusing the hypotheses to maximize a total saving of the overlapping hypotheses.

2. The method of claim 1, further comprising tracking of the hypotheses.

3. The method of claim 1, wherein:
   at least one image comprising a plurality of pixels is provided by streaming video;
   the motion likelihood image is for providing a likelihood of each pixel belonging to a foreground of the image; and
   the model likelihood image is for providing a likelihood of each pixel belonging to a target in the image.

4. The method of claim 3, wherein the fusion comprises merging a likelihood of each pixel belonging to a foreground of the image and a likelihood of each pixel belonging to a target in the image.

5. The method of claim 4, further wherein if there is no likelihood of each pixel belonging to a foreground of the image or there is no likelihood of each pixel belonging to a target in the image, then a result of the fusion would comprise the likelihood of each pixel belonging to a target in the image or the likelihood of each pixel belonging to a foreground of the image, respectively.

6. The method of claim 5, further comprising tracking of the hypotheses.

\* \* \* \* \*